United States Patent
Nakajima

(10) Patent No.: US 6,200,357 B1
(45) Date of Patent: Mar. 13, 2001

(54) HEATING MEDIUM AND USE OF THE SAME

(75) Inventor: Kyoko Nakajima, Iruma (JP)

(73) Assignee: Kabushiki Kaisha Kyodo, Saitama-ken (JP)

( * ) Notice: Subject to any disclaimer, the term of this patent is extended or adjusted under 35 U.S.C. 154(b) by 0 days.

(21) Appl. No.: 09/516,811

(22) Filed: Mar. 1, 2000

(30) Foreign Application Priority Data

Feb. 17, 2000 (JP) .................................................. 12-39298

(51) Int. Cl.[7] ...................................................... C09K 5/00
(52) U.S. Cl. ......................... 44/252; 126/263.05; 149/37
(58) Field of Search ...................... 44/252; 126/263.05; 149/37

(56) References Cited

U.S. PATENT DOCUMENTS

| | | | |
|---|---|---|---|
| 1,010,768 | * | 12/1911 | Isaacs ..................................... 44/252 |
| 1,019,377 | * | 3/1912 | Smith ..................................... 44/252 |
| 1,488,656 | * | 4/1924 | Wallace ................................... 44/252 |
| 2,289,007 | * | 7/1942 | Gessler .................................... 44/252 |
| 3,077,455 | * | 2/1963 | Racke ...................................... 44/252 |
| 3,353,937 | * | 11/1967 | Ford et al. ............................ 44/252 |
| 3,489,689 | * | 1/1970 | Tao et al. .............................. 44/252 |
| 3,766,079 | * | 10/1973 | Jackman et al. ...................... 44/252 |
| 3,871,357 | * | 3/1975 | Grosso et al. ....................... 126/263 |
| 4,114,591 | * | 9/1978 | Nakagawa ............................. 126/263 |
| 4,119,082 | * | 10/1978 | Miyamori ............................. 126/263 |

FOREIGN PATENT DOCUMENTS

| | | | |
|---|---|---|---|
| 2321745 | * | 2/1974 | (DE) . |
| 56-020450 | * | 2/1981 | (JP) . |
| 03179080 | * | 1/1985 | (JP) . |
| 61-199822 | * | 1/1985 | (JP) . |
| 64-0000187 | * | 1/1989 | (JP) . |

OTHER PUBLICATIONS

Copy of European Patent Application Search Report dated May 25, 2000 with three Database WPI abstracts, JP 01 043594, JP 61 199822 and JP 56 03478.

* cited by examiner

Primary Examiner—Margaret Medley

(57) ABSTRACT

35 g of a heating medium comprising 70 to 85% of powdered aluminum and 15 to 30% of powdered calcium oxide on the basis of the total weight of the heating medium is contacted with 80 ml of water to react the powdered calcium with water at a first reaction step to generate heat of reaction and calcium hydroxide, and then the calcium hydroxide is reacted at a second reaction step with powdered aluminum to generate heat of reaction to make use of approximately 3886 cal/g as the sum of the heat of reaction generated at the first reaction step and second reaction step, which can arrive at temperatures of approximately 100 ° C. for a short time which can be maintained for at least 20 minutes. The heating medium of this invention is built in a heating apparatus of a heating cooking container without increasing the weight and bulk of the container.

3 Claims, No Drawings

HEATING MEDIUM AND USE OF THE SAME

BACKGROUND OF THE INVENTION

1. Field of the Invention

This invention relates to a heating medium and a use of the same. More particularly, this invention relates to a heating medium comprising powdered aluminum and powdered calcium oxide in a specific blending ratio and a method of using the heating medium by contacting it with water. The heating medium of this invention is useful to an apparatus requiring temperatures of approximately 100° C. for at least 20 minutes, for example, a heating apparatus of a heating cooking container of a food for emergency or a field ration.

2. Description of the Prior Art

In recent years, there has been increased the use of a food which is heated and warmed in situ by means of a heating apparatus built in a heating cooking container in which a food for emergency, a liquid food such as sake and so on or various kinds of field rations such as lunch and so on are contained in the heating cooking container.

As one of the heating apparatus has been proposed a various kinds of heating apparatus making use of exothermic reaction of a chemical compound, which are roughly classified into three types, one is a type making use of addition reaction of water to an oxide, the other is a type making use of reaction of a metal with an acid, and another is a type making use of addition reaction of water to anhydrous salt.

The Japanese Food Sanitation Law provides that an apparatus and a food packing container which are used in business should be clean and be in sanitary conditions (Article 8) and that an apparatus and a food packing container which contain harmful and poisonous substances and have a bad influence on human health by coming into contact with a food should not be used (Article 9). Therefore, the types making use of the reaction of a metal with an acid or addition reaction of water to magnesium-iron alloy have been considered to be preferable because of generation of a peculiar smell. It is considered that this is true also in other countries than Japan.

In addition to the regulation of the Food Sanitation Law, there are some requirements for the field ration which is heated and warmed in situ as a portable food or field ration. That is to say, it should be right and compact. Accordingly, the weight and/or bulk of the heating cooking container should not be extremely increased by incorporating the heating apparatus into the heating cooking container. And furthermore, the heating apparatus should generate heat for a short time by simple operation at any time everywhere a wearer goes.

For reasons as stated above, that is to say, for the regulation of the Food Sanitation Law, right weight and compact, simplicity of operation, efficiency and so the type making use of heat of addition reaction of water to calcium oxide takes up the mainstream of a heating medium built in the heating cooking container.

By the way, there are various kinds of form and bulk for the heating cooking container, that is, approximately 200 cm$^3$ at the minimum and approximately 2000 cm$^3$ at the maximum. The inventor of this invention carried out fact-finding on the time at the maximum required from opening of a portable food to finish of eating or drinking with respect to "sake" the bulk of which is relatively small and a box lunch sold at a railroad station the bulk of which is relatively large, as a result, we have found it was approximately 20 minutes.

And we have found that a portable box lunch or food should be heated at approximately 90° C. and above in order to heat and warm it completely depending on contents therein. Since the heat capacity of a material of the heat cooking container itself is low, insulating effectiveness can not be expected to the heat cooking container itself. And furthermore, we have found that the heating medium used in the heating apparatus itself has to give rise to exothermic reaction to arrive at the maximum temperature and has effect on maximizing the time required for lowering at least to a room temperature from the maximum temperature, that is to say, temperature retention time.

As stated previously, the type making use of heat of addition reaction of water to calcium oxide has token up the mainstream of a heating medium built in the heating cooking container. While the heating medium making use of heat of addition reaction of water to calcium oxide fulfills the requirements of the Japanese Food Sanitation Law, it is required that a large quantity of calcium oxide is used in order to arrive at 90° C. and above immediately after reaction which is maintained for at least 20 minutes because calorific value of the reaction of water with calcium oxide is small, which causes increase in the weight and bulk of the heat cooking container.

SUMMARY OF THE INVENTION

An object of this invention is to raise speedily the temperature of a heating medium to a temperature of 90° C. and above and maintain the temperature for at least 20 without increasing the weight and bulk of a heat cooking container and without making use of a large quantity of a heating medium used in a heating apparatus of the heat cooking container.

Another object of this invention is to raise speedily the temperature of a heating medium making use of a reaction of water with calcium oxide which is used in a heating apparatus of the heat cooking container for to a temperature of 90° C. and above immediately after the reaction and maintain the temperature for at least 20 without increasing the weight and bulk of a heat cooking container and without making use of a large quantity of calcium oxide.

According to a first aspect of this invention there is provided a heating medium comprising 70 to 85% of powdered aluminum and 15 to 30% of powdered calcium oxide on the basis of the total weight of the heating medium.

According to a second aspect of this invention there is provided a method of using a heating medium comprising 70 to 85% of powdered aluminum and 15 to 30% of powdered calcium oxide on the basis of the total weight of the heating medium comprising the steps of a first reaction step of contacting the heating medium with a given quantity of water to react the powdered calcium oxide with water to generate heat of reaction and form calcium hydroxide, and a second reaction step of reacting powdered aluminum with the calcium hydroxide formed in the first step to generate heat of reaction to make use of the sum of the heat of reaction generated in the first and second steps, said first reaction step and said second reaction step being continuously performed in situ.

According to a third aspect of this invention there is provided a method of using a heating medium described in the second aspect of this invention, in which the quantity of water is at least two times the weight of the heating medium.

DESCRIPTION OF THE PREFERRED EMBODIMENTS

As a result of devoted study, the present inventor has discovered that the aforementioned problems can be solved by making use of aluminum in combination with calcium oxide. Accordingly, this invention is based on the discovery.

While the present inventor don't like to be pinioned to theory, a description is given below on the reaction mechanism between the reaction of water with calcium oxide at the first step and the reaction mechanism between the reaction of calcium hydroxide formed by the reaction of calcium oxide with water at the first step with aluminum at the second step.

Calcium oxide is reacted with water according to the following reaction formula (1) to form calcium oxide while generating a large quantity of heat;

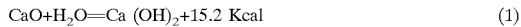

$$CaO+H_2O=Ca(OH)_2+15.2\ Kcal \qquad (1)$$

Caloric value 15.2 Kcal is divided by 56.08, that is, a molecular weight of CaO to obtain 271 cal/g.

As a result of the reaction (1), an aqueous solution is made strongly alkaline by hydrolysis of calcium hydroxide prepared.

On the other hand, powdered aluminum is reacted rapidly with calcium hydroxide according to the following formula (2) to form calcium aluminate and hydrogen:

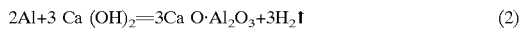

$$2Al+3\ Ca(OH)_2=3Ca\ O\cdot Al_2O_3+3H_2\uparrow \qquad (2)$$

Heat of reaction generated at the reaction (2) is approximately 47 Kcal which is divided by 13, that is, a molecular weight of Al to obtain approximately 3615 cal/g.

Accordingly, approximately 3886cal of quantity of heat can be obtained by using 1 g of powdered calcium oxide and 1 g of powdered aluminum. It would be considered that one could think it would be better to use powdered aluminum entirely without using calcium oxide. Since, however, the sole aluminum is not reacted with water in the absence of calcium oxide unless the reaction temperature rises to 100° C. and above, the reaction of calcium with water is absolutely required. That is to say, according to this invention, two step-reactions are carried out in which calcium oxide and water are reacted at the first step, then calcium hydroxide formed at the first step and powdered aluminum are reacted. In other words, it could be understood that calcium hydroxide formed by the reaction of calcium oxide with water serves as a kind of initiator for reacting powdered aluminum at temperatures below 100° C.

The calcium aluminate formed at the reaction of (2) can not be illustrated by single chemical formula, but also illustrated by $CaO\cdot Al_2O_3$, $Ca_3[Al(OH)_6]_2$, $2Ca(OH)_2\cdot Al(OH)_3 5/2H_2O$, $CaO\cdot 2Al_2O_3$ and so on. It should be, therefore, understood that the chemical foumular (2) is one of typical reactions of aluminum with calcium hydroxide.

The primary important thing for the heating medium of this invention is that the reaction temperature rises speedily to temperatures of 90° C. and above immediately after the first step reaction, that is, the reaction of calcium oxide with water and that the temperatures are maintained for at least 20 minutes. And the secondary important thing for the heating medium of this invention is that it does not increase the weight and bulk of the heating apparatus of the heating cooking container in which it is built.

Accordingly, the means to solve the problems is to restrict the amounts of powdered calcium oxide and powdered aluminum used to specific range taking the aforementioned several requirements and conditions to produce the aforementioned effects.

The present inventor gave my attention to the fact that the calorific value of powdered aluminum is approximately 13 times that of calcium oxide, and thought it is advantageous to use powdered aluminum as a main component and calcium oxide as a sub-component for the heating medium of this invention in order to rise speedily the reaction temperature to 90° C. and above which is maintained for at least 20 minutes.

While a different glades of calcium oxide is now commercially available, it is preferable to use calcium oxide with impurities as little as possible in order to accelerate the reaction rate and obtain heat of reaction as in quantity as possible. Therefore, calcium oxide used in this invention is calcium oxide having 90% and above of CaO content, 3.2% and below of impurities and 2.0% and below of $CO_2$, more preferably calcium oxide having 93% and above of CaO content, 3.2% and below of impurities and 2.0% and below of $CO_2$, most preferably calcium oxide having 95% and above of CaO content, 1.8% and below of impurities and 0.9% and below of $CO_2$.

The smaller the grain size of calcium oxide used in this invention is, the more speedily the reaction rate is. Conversely, the smaller grain size of calcium oxide is hard to handle. Accordingly, the most preferable particle size of calcium oxide used in this invention is within a range from 100 mesh (90% and above of $-150\ \mu m$) to 200 mesh (95% and above of $-750\ \mu m$).

Aluminum of Types I, II and III may be used in this invention, that is, Type I having 99.7% and above of Al metal purity, 0.8 to 1.1 g/cm³ of apparent density, and particle size distribution in which $-330$ mesh($-45\ \mu m$) is 35 to 60%, $+330$ mesh ($+45\ \mu m$) is 15 to 30%, $+235$ mesh ($+63\ \mu m$) is 5 to 15% and $+140$ mesh ($+106\ \mu m$) is 7>, Type II having 99.7% and above of Al metal purity, 0.8 to 1.1 lg/cm³ of apparent density, and particle size distribution in which $-330$ mesh ($-45\ \mu m$) is 40 to 60%, $+330$ mesh ($+45\ \mu m$) is 15 to 30%, $+235$ mesh ($+63\ \mu m$) is 15> and $+200$ mesh ($+75\ \mu m$) is 10>, and Type III having 99.7% and above of Al metal purity, 0.8 to 1.1 g/cm³ of apparent density, and particle size distribution in which $-330$ mesh($-45\ \mu m$) is 70 to 90%, $+330$ mesh ($+45\ \mu m$) is 30>, $+235$ mesh ($+63\ \mu m$) is 3> and $+200$ mesh ($+75\ \mu m$) is 2>. Type II is the most preferable in this invention taking the reaction rate, easiness in handle and cost into consideration.

The significant requirements for specifying each amount of powdered calcium oxide and powdered aluminum in this invention are that a rise-time to exothermic reaction is short, the sum of the calorific value is large, temperature of 90° C. and above are maintained for at least 20 minutes, the heating medium of this invention does not increase the weight and bulk of the heating cooking container in which it is built, and the amount of water added is as small as possible.

Therefore, the present inventor set the amount of water to the total weight of the heating medium comprising powdered calcium oxide and powdered aluminum in approximately twofold and calculated each amount of powdered calcium oxide and powdered aluminum satisfying the aforementioned several requirements according to chemical kinetics, which was then demonstrated by experiments. As a result, it has been discovered that the amounts of powdered calcium oxide and powdered aluminum are 15 to 30% and 70 to 85% on the basis of the total weight of the heating medium comprising them, respectively.

Accordingly, it should be understood that there is a correlation between each amount of powdered calcium oxide and powdered aluminum, the reaction rate, the highest temperature and retention time of the highest temperature, as well as the amount of water added to react.

The heating medium comprising powdered calcium oxide and powdered aluminum of this invention is packed in a bag of nonwoven fabric, Japanese paper, synthetic paper and so on having given weight per m² which is then packed in a non-water permeable bag made of aluminum foil and so on to prevent the powdered calcium oxide from absorbing moisture in the atmosphere to react therewith. When using the heating medium of this invention, the heating medium of this invention packed in the non-water permeable bag is put in a proper container into which water is added in amount of approximately two times the weight of the heating medium at the maximum.

Accordingly, this invention includes a heating medium, per se, comprising 70 to 85% of powdered aluminum and 15 to 30% powdered calcium oxide on the basis of the total weight of the heating medium and a method of using the heating medium by making use of water in amount of approximately two times the weight of the heating medium at the maximum.

And furthermore, the heating medium of this invention can be used by incorporating into a heating cooking container of a portable food. The heating cooking container into which the heating medium of this invention can be incorporated is made of synthetic resin such as polyvinyl chloride, polyethylene, polystyrene, polyvinilidene chloride, polyethylene terephthalate, polymethyl methacrylate, nylon, polymethylpentene and so on, synthetic resin-treated aluminum, synthetic resin-treated paper, metal can, combined-material of metal and synthetic resin aluminum.

The most preferred working embodiment of this invention is to contact at the first reaction step the heating medium comprising 70 to 85% of powdered aluminum and 15 to 30% powdered calcium oxide on the basis of the total weight of the heating medium with water in amount of approximately two times the weight of the heating medium at the maximum to generate heat of reaction and calcium hydroxide, and then at the second reaction step to react powdered aluminum with the calcium hydroxide formed at the first step to generate heat of reaction to use sum of the heat of reaction generated at the first and second reaction steps.

This invention is detailed in greater detail herein in the following examples, test examples and comparative examples, which are illustrated and are not to be taken as limiting of this invention.

EXAMPLE

Powdered aluminum used in the following examples, test examples and comparative examples was "ATOMIZ-ALUMI VA-200" (trade name) commercially available from YAMAISHI METAL CO. LTD., which has 99.7% and above of Al metal purity, 0.8 to 1.1 g/cm³ of apparent density, and particle size distribution in which −330 mesh (−45 μm) is 40 to 60%, +330 mesh (+45 μm) is 15 to 30%, +235 mesh (+63 μm) is 15> and +200 mesh (+75 μm) is 10>.

Powdered calcium used in the following examples, test examples and comparative examples was made by ARI-GAKI MINING INDUSTRY CO. LTD., mesh of which was 200 (95% and above of −75 μm).

Nonwoven fabric used in the following examples, test examples and comparative examples was that has weight of 60 g/m², 0.14 mm in thickness, 20 cc/cm² in air permeability volume and 6.0 Kg in heat sealing strength.

Example 1

A 1000 cc glass-made container measuring 140 mm (length)×750 mm (width)×115 mm (depth) was covered with aluminum foil in which two temperature sensors were inserted, the top of one of which was positioned at nearly the middle of the depth of the container, and the top of the other of which was positioned at the middle of the heating medium. 75 g of the aforementioned powdered aluminum and 30 g of the aforementioned powdered calcium oxide were thoroughly mixed to prepare a heating medium. Then, 35 g of the heating medium were put into a nonwoven-made bag measuring 140 mm (length)×450 mm (width)×4 mm (thickness). The bag containing the heating medium was put on the bottom of the aforementioned container into which then were added 80 ml of water. After 30 seconds, exothermic reaction started. Temperatures of steam generated were measured continuously to obtain the highest temperature of the steam, time required for the steam to lower from the highest temperature of the steam to 80° C., that is, retention time and the highest temperature of the middle portion of the heating medium.

Example 2

The same procedures as those of Example 1 were repeated except that 85 g of powdered aluminum and 25 g of powdered calcium oxide were used.

Example 3

The same procedures as those of Example 1 were repeated except that 95 g of powdered aluminum and 20 g of powdered calcium oxide were used.

The results obtained by Examples 1, 2 and 3 were shown in Table 1.

TABLE 1

|  | Example 1 | Example 2 | Example 3 |
|---|---|---|---|
| aluminum (g) | 75 | 85 | 95 |
| calcium oxide (g) | 30 | 25 | 20 |
| weight of heating medium used (g) | 35 | 35 | 35 |
| water added (cc) | 80 | 80 | 80 |
| highest temp. of steam (° C.) | 92.7 | 92.8 | 92.5 |
| highest temp. of the middle portion of heating medium (° C.) | 105.5 | 105.5 | 105.5 |
| retention time (min). | 22.0 | 23.75 | 25.5 |
| room temperature (° C.) | 17.6 | 17.7 | 17.8 |
| weight of heating medium and water (g) (*1) | 65.8 | 63.7 | 61.2 |

(*1) weight of aqueous solution containing heating medium after allowing to stand for 12 hours after using heating medium Test Example The steam generated in Examples 1, 2 and 3 were cooled and collected to analyze. The results obtained were shown in Table 2.

TABLE 2

|  |  | lower limit of determination |
|---|---|---|
| turbidity (*2) | not detected | 2 |
| pH (*3) | 9.6 (19.0° C.) |  |
| residue (mg/l) (*4) | not detected | 50 |
| Arsenic (mg/l) (*5) | not detected | 0.2 |

TABLE 2-continued

| | | lower limit of determination |
|---|---|---|
| Cadmium (mg/l) (*6) | not detected | 0.5 |
| Lead (mg/l) (*7) | not detected | 5 |

(*2) water test method IV 3
(*3) glass electrode pH meter
(*4) water test method IV 11.2
(*5) hydride atomic-absorption spectroscopy
(*6) flame atomic-absorption spectroscopy
(*7) flame atomic-absorption spectroscopy It is proved from the results shown in Table-2 that the heating medium of this invention does not contain impurities such as, Cd, Pb and so on derived from powdered aluminum and powdered calcium oxide.

Comparative Examples 1,2 and 3

The same procedures as those in Example 1 to 3 were repeated except that powdered aluminum and powdered calcium oxide were used in amounts shown in Table-3 to carry out Comparative Examples 1,2 and 3. The results obtained were shown in Table-3.

TABLE 3

| | Com. Example 1 | Com. Example 2 | Com. Example 3 |
|---|---|---|---|
| aluminum (g) | 55 | 60 | 65 |
| calcium oxide (g) | 36 | 32 | 30 |
| weight of heating medium used (g) | 35 | 35 | 35 |
| water added (cc) | 80 | 80 | 80 |
| highest temp. of steam (° C.) | 80.7 | 84.8 | 82.5 |
| highest temp. of the middle portion of heating medium (° C.) | 83.5 | 86.5 | 84.7 |
| retention time (min) | 22.0 | 23.75 | 25.5 |
| room temperature (° C.) | 17.6 | 17.7 | 17.8 |
| weight of heating medium and water (g) (*1) | 62.8 | 61.7 | 61.9 |

(*1) weight of aqueous solution containing heating medium after allowing to stand for 12 hours after using heating medium As a result of Comparative Examples 1, 2 and 3, it is proved that the heating medium comprising 60~68 weight % of powdered aluminum and 32~40 weight % of powdered calcium oxide aluminum can not produce the same effect as that obtained by the heating medium of this invention.

According to this invention the effects exemplified below can be obtained:

(1) According to this invention, a heating medium comprising powdered aluminum having high calorific value and powdered calcium oxide in specific blending ratio is contacted with water to react at a first reaction step the powdered calcium oxide with water to generate heat of reaction and calcium hydroxide, then the powdered aluminum is reacted at a second reaction step with the calcium hydroxide generated at the first reaction step to generate heat of reaction and, consequently, sum of the heat of reaction generated at the first and second reaction steps can be efficiently used compared with a conventional heating medium comprising a single component of calcium oxide.

(2) The heating medium of this invention can arrive at the highest temperature of approximately 100° C. at the reaction rate of 30 seconds and can maintain the highest temperature for 20 minutes by making use of relatively small amount of heating medium and water, for example, 70 cc of water to 35 g of heating medium.

(3) Since the heating medium of this invention is of lightweight and not bulky in spite of the fact that it can maintain temperatures of approximately 100° C. for 20 minutes and above, it does not remarkably increase the weight and bulk of a heating cooking container, even if it is built therein, which does not cause inconvenience for an emergency food or portable food.

What I claim is:

1. A heating medium comprising 70 to 85% of powdered aluminum and 15 to 30% of powdered calcium oxide on the basis of the total weight of the heating medium.

2. A method of generating heat with water and a heating medium comprising 70 to 85% of powdered aluminum and 15 to 30% of powdered calcium oxide on the basis of the total weight of the heating medium comprising the steps of:

a first reaction step of contacting the heating medium with a given quantity of water to react the powdered calcium oxide with water to generate heat of reaction and form calcium hydroxide, and a second reaction step of reacting powdered aluminum with the calcium hydroxide formed in the first step to generate heat of reaction to make use of the sum of the heat of reaction generated in the first and second steps, said first reaction step and said second reaction step being continuously performed in situ.

3. The method of claim 2, wherein the quantity of water is two times the weight of the heating medium at the maximum.

* * * * *